United States Patent
Farley

(10) Patent No.: US 6,537,455 B2
(45) Date of Patent: Mar. 25, 2003

(54) ELONGATED HAND-HELD SHOWER HEAD AND FILTER

(76) Inventor: David K. Farley, 1827 Capital St., Corona, CA (US) 91720

( * ) Notice: Subject to any disclaimer, the term of this patent is extended or adjusted under 35 U.S.C. 154(b) by 0 days.

(21) Appl. No.: 09/870,439

(22) Filed: May 29, 2001

(65) Prior Publication Data

US 2002/0179515 A1 Dec. 5, 2002

(51) Int. Cl.⁷ .............................................. B01D 24/42
(52) U.S. Cl. ..................... 210/251; 210/282; 210/449; 239/283; 239/553.3
(58) Field of Search ................................. 210/282, 449, 210/460, 251; 239/283, 461, 553.3, 525

(56) References Cited

U.S. PATENT DOCUMENTS

| | | | | |
|---|---|---|---|---|
| 3,865,310 A | * | 2/1975 | Elkins et al. | 239/283 |
| 4,091,998 A | * | 5/1978 | Peterson | 239/283 |
| 5,152,464 A | | 10/1992 | Farley | 239/553.3 |
| 5,300,224 A | | 4/1994 | Farley | 210/266 |
| 5,503,742 A | | 4/1996 | Farley | 210/238 |
| 5,545,314 A | * | 8/1996 | Parise et al. | 210/449 |
| 5,795,471 A | * | 8/1998 | Naito | 210/282 |
| 5,914,043 A | | 6/1999 | Farley | 210/668 |
| 6,016,977 A | | 1/2000 | Farley | 239/553.3 |
| 6,056,875 A | | 5/2000 | Farley | 210/263 |
| 6,187,187 B1 | | 2/2001 | Farley | 210/223 |
| 6,214,224 B1 | | 4/2001 | Farley | 210/282 |

* cited by examiner

Primary Examiner—Ivars Cintins
(74) Attorney, Agent, or Firm—James G O'Neill

(57) ABSTRACT

A combination hand held shower head and water filter assembly for removing chlorine and other substances from hot shower water. This assembly includes an elongated filter housing with an elongated shower head pivotably secured thereto by an extended swivel and ball arrangement. The elongated, filter housing holds filter media therein and the combination device may be alternatively held in a holding bracket by shaped ends of either the elongated filter housing or the elongated shower head.

5 Claims, 3 Drawing Sheets

ELONGATED HAND-HELD SHOWER HEAD AND FILTER

BACKGROUND OF THE INVENTION

1. Field of the Invention

This invention relates generally to devices for treating fluids and, more particularly, to an elongated combination hand-held shower head and filter for use in washing hard to reach areas, and the removal of unwanted contaminants, such as chlorine, from water.

2. Description of Related Art

Currently, approximately 80% of all potable water systems in the U.S. contain chlorine as disinfectant. These systems use different devices and methods for dechlorination of water at the point-of-entry ("POE") into a commercial, industrial or residential building, and/or the point-of-use ("POU") at a faucet, shower head or tap.

The present invention is drawn to a POU water treatment system primarily used in residential, and to some degree, in commercial and industrial applications.

There are a number of known shower filters that use various types of media to filter out impurities in water. These include U.S. Pat. Nos. 5,152,464, 5,300,224, 5,503,742, 5,914,043, 6,016,977, 6,056,875, 6,187,187 and 6,214,224 to Frederick A. Farley and David K. Farley, applicant herein.

While the foregoing prior art devices, filter media and methods provide improved filtration of water passing through them, they have limitations in use, particularly for tall persons and/or those who have problems utilizing available hand-held shower heads, to clean or wash hard to reach areas on their bodies when they are in a shower stall or bath tub.

SUMMARY OF THE INVENTION

Accordingly, it is a general object of the present invention to provide an improved shower water filter. It is a particular object of the present invention to provide an improved hand held device for filtering contaminants from water. It is a still more particular object of the present invention to provide an improved elongated combination hand held shower head and filter for filtering contaminants from hot water passing there through at high flow rates. It is yet a particular object of the present invention to provide an improved elongated combination hand held shower head and water filter for use to reach hard to wash portions of a person's body. It is a further particular object of the present invention to provide an improved elongated combination hand held shower head and water filter having a swivel shower head attached to an elongated in line hose filter that is sized and dimensioned to it into a holding bracket in two positions.

In accordance with one aspect of the present invention, there is provided a combination hand-held shower head and water filter having an elongated shower element having an extended swivel held in one end of an in-line water filter element that contains a filter media or removable filter cartridge, and which is versatile and easy to use.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the accompanying drawings, in which:

DESCRIPTION OF THE PREFERRED EMBODIMENTS

Figure 1:
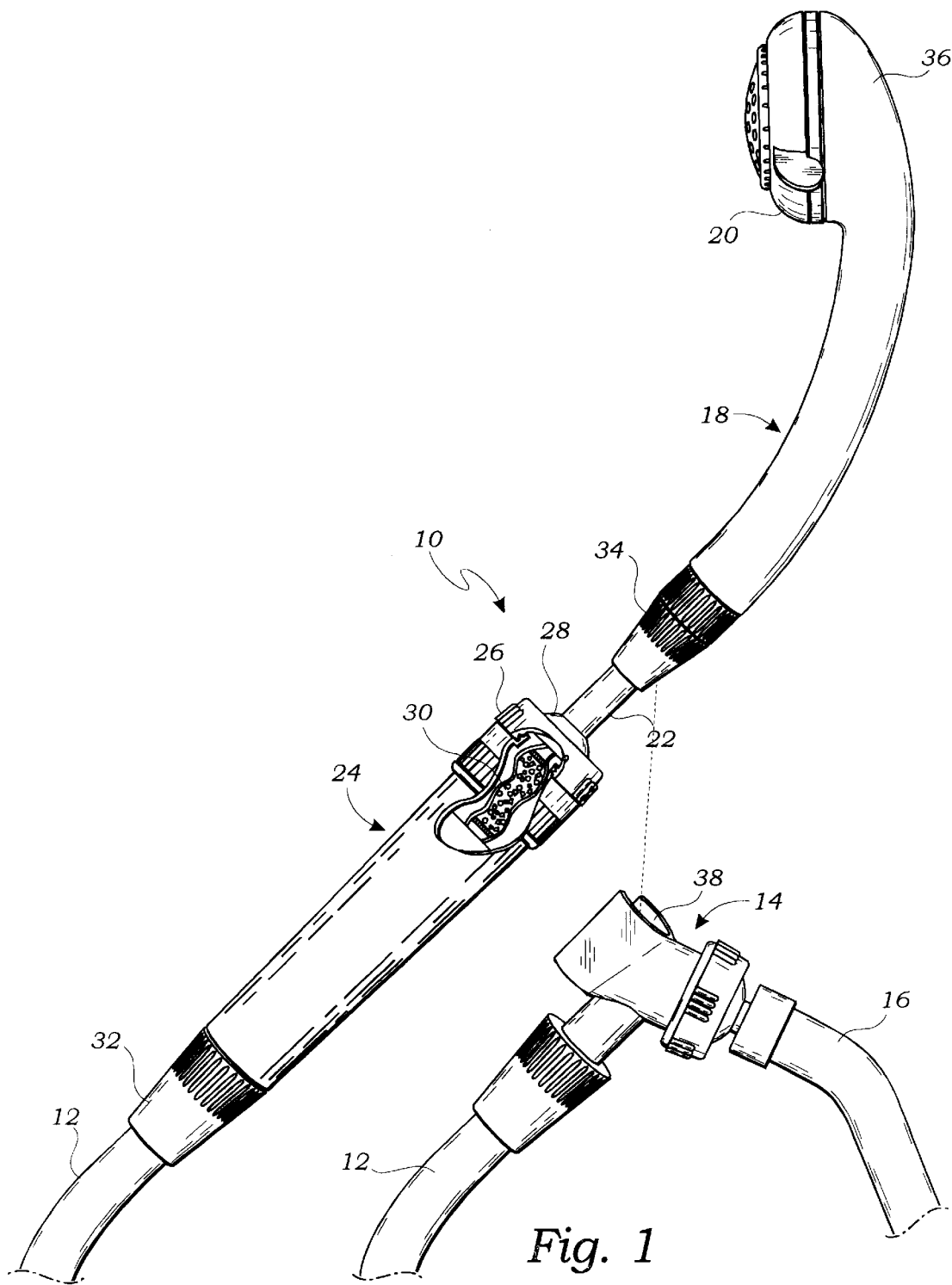
FIG. 1 is an exploded perspective view, partially in cross-section, of a preferred embodiment of an elongated combination hand-held shower head and filter assembly of the present invention, removed from a holding bracket.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide an explanation of a novel elongated combination hand-held shower head and filter assembly for use in filtering toxic substances, such as chlorine, from hot water, passing through the assembly of the present invention.

Turning now to the drawings, there shown is a combination hand-held shower head and filter assembly 10, which is secured to one end of a flexible fluid conduit or hose 12. The other end of the conduit 12 is secured to a holding bracket 14, connected to a shower arm 16, to carry water to and through the assembly 10. The assembly 10 includes an elongated, hollow shower head 18 that may be constructed in any conventional or known manner from any acceptable material, such as a high strength plastic or the like. The elongated, hollow shower head 18 is preferably curved and may be used as a handle portion for grasping or holding the assembly 10. A lower portion of the shower head 18 is secured as by an extending swivel portion 22 to a ball or the like 28 pivotably held in a first or upper end 26 of a filter 24. The filter 24 is preferably elongated and may be curved or conical, and may also be used as a handle portion for grasping or holding the assembly 10. The filter 24 includes filter media 30 held in a central hollow chamber formed therein, or may have a removable and reversible filter element held within the hollow chamber. The filter 24, may be formed in any desired elongated shape, but is illustrated for reason of explanation only as being a tapered, cylindrical element, with a second or lower end 32 secured to the hose 12.

The shower head 18 may take any desired shape, but preferably has an elongated, curved, hollow body with the swivel 22 and ball 28 secured to a lower end 34 and an adjustable spray head 20 secured to an upper end 36.

In use, when water flows from the shower arm 16, it passes through the bracket 14 and conduit 12; the assembly 10 may be used when resting in the bracket or may be gasped by the shower head 18 or the filter 24. The water passes through the filter media 30 in filter 24, and then through the extended swivel 22 and body of the shower head 18 before exiting through the adjustable spray head 20.

Figure 2:
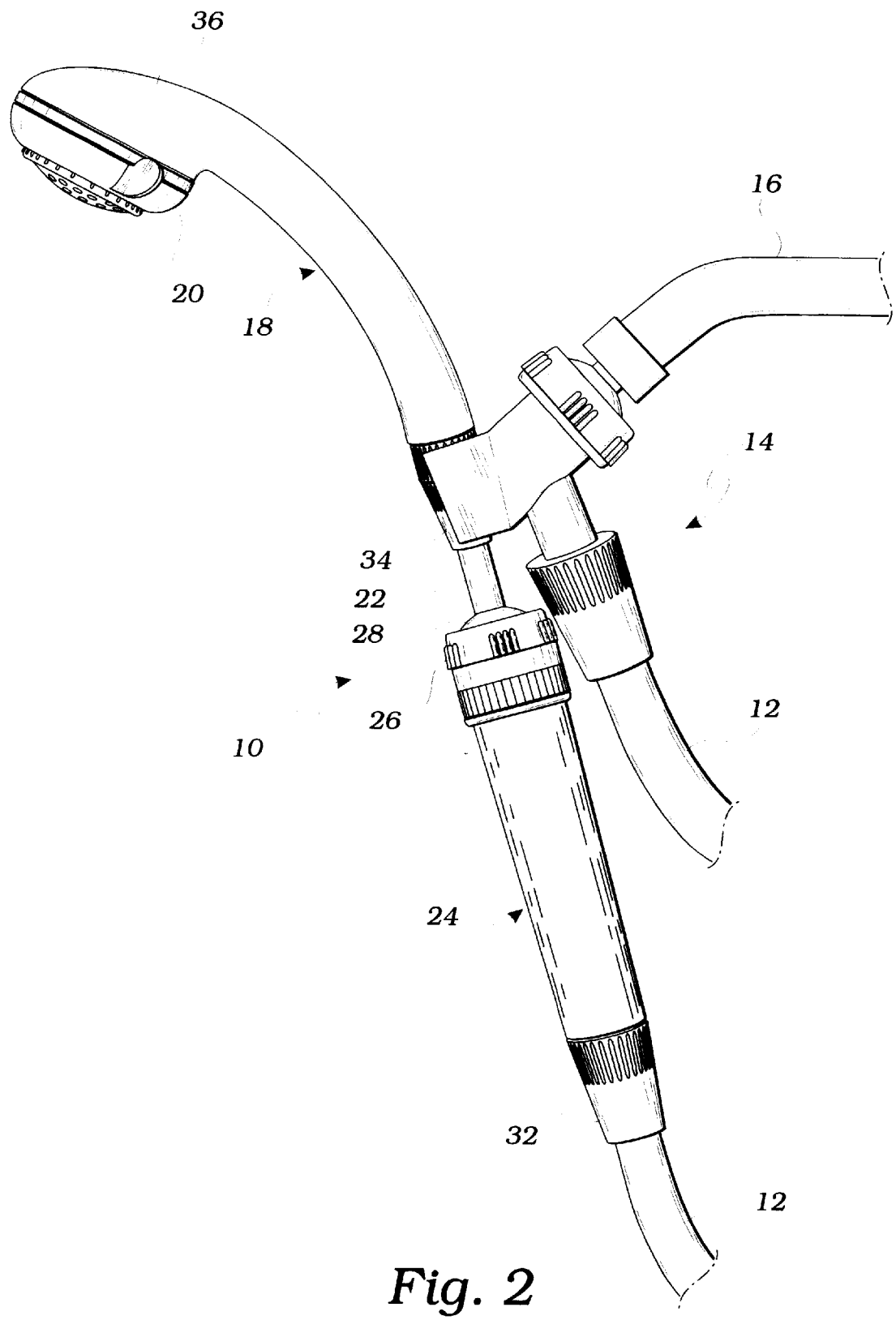
FIG. 2 is a side elevational view of the assembly of FIG. 1 inserted and held in a holding bracket by an extended swivel portion of the elongated shower head.
Figure 3:
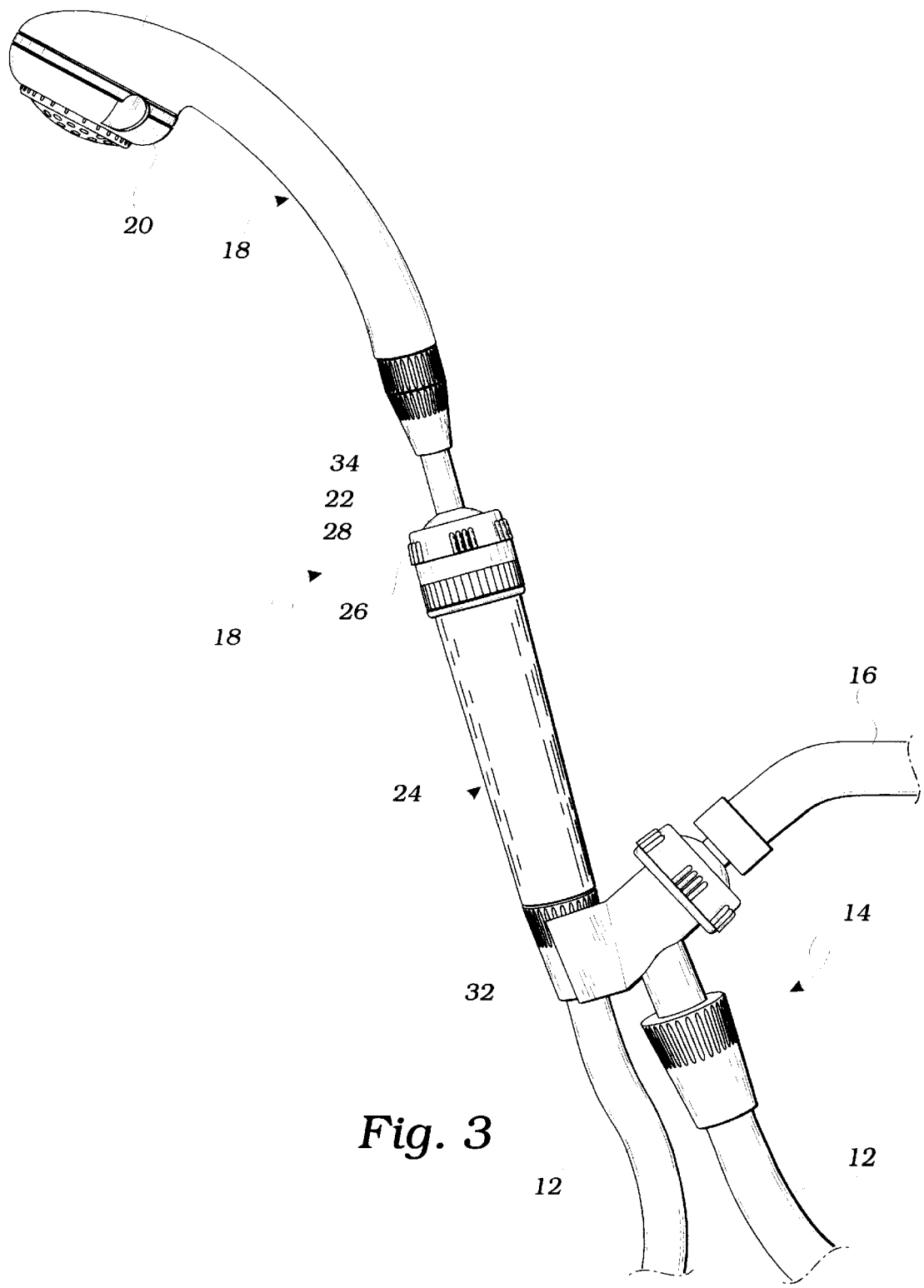
FIG. 3 is a further side elevational view of the assembly of FIG. 1 inserted and held in the holding bracket by a lower end of the filter.

Turning now to FIGS. 2 and 3, the lower ends 32, 34 of the filter 24 and shower head 18 of the assembly 10 have been specifically sculpted, i.e., sized and dimensioned to fit in and be held in a matched holding portion or opening 36 (see FIG. 1) formed in bracket 14. Therefore, the assembly 10 may be alternately or selectively supported in the opening 38 in bracket 14, by inserting the lower end 34 of shower head 18 (see FIG 2), or the lower end 32 of the filter 24 (see FIG. 3) therein.

When water is turned on and flowing through the assembly 10, the assembly may be used in either of the positions shown in FIGS. 2 and 3, or may be removed from the bracket 14 as show in FIG. 1 and manipulated to easily rinse or wash off a person's entire body, including those areas that are hard or impossible to reach using prior art devices. One obvious advantage of the device of the present invention is illustrated in FIG. 3, wherein the elongated length of the assembly enables above average or tall persons to more easily use the device of the present invention.

It, therefore, can be seen that the device of the present invention provides a versatile hand held unit, which can be used in a number of ways to provide a more complete showering or washing experience. Furthermore, the combined shower head and filter, provides a hand-held unit that both dechlorinates hot water passing therethrough, and allows for the rinsing or washing of hard to reach areas of some persons' bodies.

Accordingly, as will be apparent to those skilled in the art, the present invention provides considerable advantages in ease and flexibility of use and for filtering chlorine or other unwanted substances from hot shower water. Particularly, the present invention provides a unique assembly having an elongated handle which contains an elongated tower-like configuration composed of an elongated shower head and elongated filter element that may be selectively held at either elongated portion, and which removes chlorine or other substances from hot water during bathing or showering. Specifically, the device herein disclosed provides for more efficiently and safely removing chlorine in a multi-use assembly.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What I claim is:

1. A combination hand held shower head and water filter assembly for removing chlorine from hot shower water, comprising:

an elongated, hollow filter body to be held in a hand having an elongated, internal chamber formed between an inlet end and an outlet end;

filter media held in the elongated, internal chamber;

the inlet end being connected to a flexible conduit;

an elongated shower head to be held in a hand having an outer spray head end and a lower, extended swivel end; the lower extended swivel end being pivotably held in the outlet end of the elongated, hollow filter body; and a bracket, adapted to be secured to a shower arm, the bracket being connected to a second end of the flexible conduit and including an opening for removably supporting the combination shower head and water filter assembly therein.

2. The combination hand held shower head and water filter assembly of claim 1 wherein the combination hand held shower head and filter assembly may be alternately removably supported in the opening by the inlet end of the elongated, hollow filter body or the lower, extended swivel end of the elongated shower head.

3. A combination hand held, water filter and shower head assembly for removing chlorine from water, comprising:

an elongated, hollow filter handle to be held in a hand having an elongated, internal chamber with filter media held therein;

a first, larger end of said elongated hollow filter handle having a ball pivotably held therein;

a second, smaller end of said elongated, hollow filter handle being secured to an elongated flexible hose secured to a holding bracket;

an elongated shower head to be held in a hand having a curved portion secured to the ball by an extended swivel portion forming a lower end of the elongated shower head;

an adjustable spray head held at an outer end of the elongated shower head; and a bracket adapted to be secured to a shower arm, the bracket including an opening for removably supporting the combination shower head and water filter assembly therein.

4. The combination shower head and water filter assembly of claim 3, wherein the combination shower head and filter assembly may be alternately removably supported in the opening by the second smaller end of the elongated, hollow filter body or the extended swivel portion of the elongated shower head.

5. A combination hand held water filter and shower head assembly for removing chlorine from water, comprising:

an elongated, tapered, hollow filter handle to be held in a hand, having an elongated, tapered, internal chamber with filter media held therein;

a first larger outlet end of said elongated, tapered, hollow filter handle having a ball pivotably held therein;

a second, smaller inlet end of said elongated, tapered, hollow filter handle being secured to an elongated flexible hose secured to a holding bracket;

an elongated shower head to be held in a hand having a curved portion secured to the ball by an extended swivel portion forming a lower inlet end of the elongated shower head;

an adjustable spray head held at an outer end of the elongated shower head; the elongated shower head having a curved portion secured between the spray head and the lower inlet end; and a bracket, adapted to be secured to a shower arm; the bracket including an opening for alternately removably supporting the combination shower head and water filter assembly in the opening by the second, smaller inlet end of the elongated, hollow filter body or the lower inlet end of the elongated shower head.

* * * * *